(12) United States Patent
Abdo et al.

(10) Patent No.: US 8,203,566 B2
(45) Date of Patent: Jun. 19, 2012

(54) FIXED FUNCTION PIPELINE APPLICATION REMOTING THROUGH A SHADER PIPELINE CONVERSION LAYER

(75) Inventors: Nadim Y. Abdo, Bellevue, WA (US); Max Alan McMullen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 12/475,287

(22) Filed: May 29, 2009

(65) Prior Publication Data

US 2010/0302261 A1   Dec. 2, 2010

(51) Int. Cl.
*G06T 15/00* (2011.01)
*G06T 15/50* (2011.01)
*G06T 1/00* (2006.01)

(52) U.S. Cl. .................. 345/522; 345/426; 345/501
(58) Field of Classification Search ............ 345/426, 345/501, 522
See application file for complete search history.

(56) References Cited

U.S. PATENT DOCUMENTS

| | | | |
|---|---|---|---|
| 6,570,573 B1 * | 5/2003 | Kazachinsky et al. ........ 345/558 |
| 7,324,106 B1 * | 1/2008 | Cabral et al. .................. 345/426 |
| 7,324,113 B1 * | 1/2008 | Rouet et al. ................... 345/522 |
| 7,369,117 B2 | 5/2008 | Evans |
| 7,426,724 B2 * | 9/2008 | Kilgard et al. ................ 717/151 |
| 7,516,447 B2 * | 4/2009 | Marvin et al. ................ 717/140 |
| 7,746,347 B1 * | 6/2010 | Brown et al. ................. 345/522 |
| 7,830,388 B1 * | 11/2010 | Lu .................................. 345/501 |
| 2006/0069797 A1 | 3/2006 | Abdo |
| 2007/0168309 A1 | 7/2007 | Tzruya |
| 2008/0244458 A1 | 10/2008 | Brugiolo |
| 2008/0316218 A1 | 12/2008 | Kilani |
| 2009/0303245 A1 * | 12/2009 | Soupikov et al. ............ 345/582 |
| 2010/0037242 A1 * | 2/2010 | Mannarswamy et al. .... 719/328 |

OTHER PUBLICATIONS

Roth, M., "Windows 7 RDP Improvements: What's in your Face?" Thincomputing.net ©, http://www.thincomputing.net/blog/windows-7-rdp-improvements-whats-in-your-face.html, Nov. 26, 2008, p. 1-4.

De Maesschalck, T., "Windows 7 Lets CPU Accelerate DirectX 10 Graphics," DarkVision Hardware, http://www.dvhardware.net/article.php?sid=31596, Nov. 29, 2008, p. 1-2.

* cited by examiner

*Primary Examiner* — Joni Hsu
(74) *Attorney, Agent, or Firm* — Woodcock Washburn LLP (57) ABSTRACT

Systems, methods and computer readable media are disclosed for sending a client graphics data across a remote session for an application, where the application makes fixed function pipeline API calls and the client and server support shader pipeline API calls for the remote session. fixed function pipeline graphics calls from sent from the application are intercepted, wrapped, converted into their fixed function pipeline equivalent graphics call or calls and then sent across the communications network to the client according to a protocol of the remote session.

20 Claims, 5 Drawing Sheets

FIXED FUNCTION PIPELINE APPLICATION REMOTING THROUGH A SHADER PIPELINE CONVERSION LAYER

BACKGROUND OF THE INVENTION

Although computers were once isolated and had minimal or little interaction with other computers, today's computers interact with a wide variety of other computers through communications networks, such as Local Area Networks (LANs) and Wide Area Networks (WANs). With the wide-spread growth of the INTERNET™, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client over a remote session. Such computing systems typically transmit the keyboard presses and mouse clicks or selections from the client to a server, relaying the screen updates back in the other direction over a network connection (e.g., the INTERNET). As such, the user has the experience as if their machine is operating as part of a LAN, when in reality the client device is only sent screenshots of the applications as they appear on the server side.

Some remote sessions support remoting graphics calls at the primitive level. This may increase the responsiveness of sessions that make those graphics calls. It may be that such a remote session supports only shader pipelines, so an application that uses a fixed function pipeline cannot take advantage of this technique in remote sessions.

SUMMARY OF THE INVENTION

It would therefore be an improvement provide in methods, systems and computer-readable storage media a mapping layer from a fixed function pipeline application programming interface (API) to a shader pipeline and to intercept graphics calls for the fixed function pipeline and convert them to shader pipeline calls that are then sent across the remote session. This would allow graphical output sent at the primitive level across the remote session from an application that uses a fixed function pipeline API to be sped up without altering the application itself.

In an exemplary embodiment, the graphics output associated with an application is being sent to a client across a remote session. All graphics calls made by an application that uses a fixed function pipeline are intercepted by a software component associated with the remote session. Those calls are then remapped to a shader pipeline. Some calls in the fixed function pipeline are identical to the shader pipeline, and thus do not need to be modified. Some calls in the fixed function pipeline have nearly equivalent calls in the shader pipeline, such as being identical, save for the name of the call. For those calls for which neither of the above two conversion methods apply, the drawing result that those calls will achieve is analyzed and a shader program that will cause the same drawing result is identified.

In a further exemplary embodiment, the graphics calls are optimized for use in a remote session. The resulting shader pipeline calls are sequenced so as to enhance remoting performance. For example, state set calls are batched together, small vertex formats are used, and meshes and vertex buffers are sent to the client only when they change It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media in accordance with this specification are further described with reference to the accompanying drawings in which.

DETAILED DESCRIPTION OF ILLUSTRATIVE EMBODIMENTS

Figure 1:
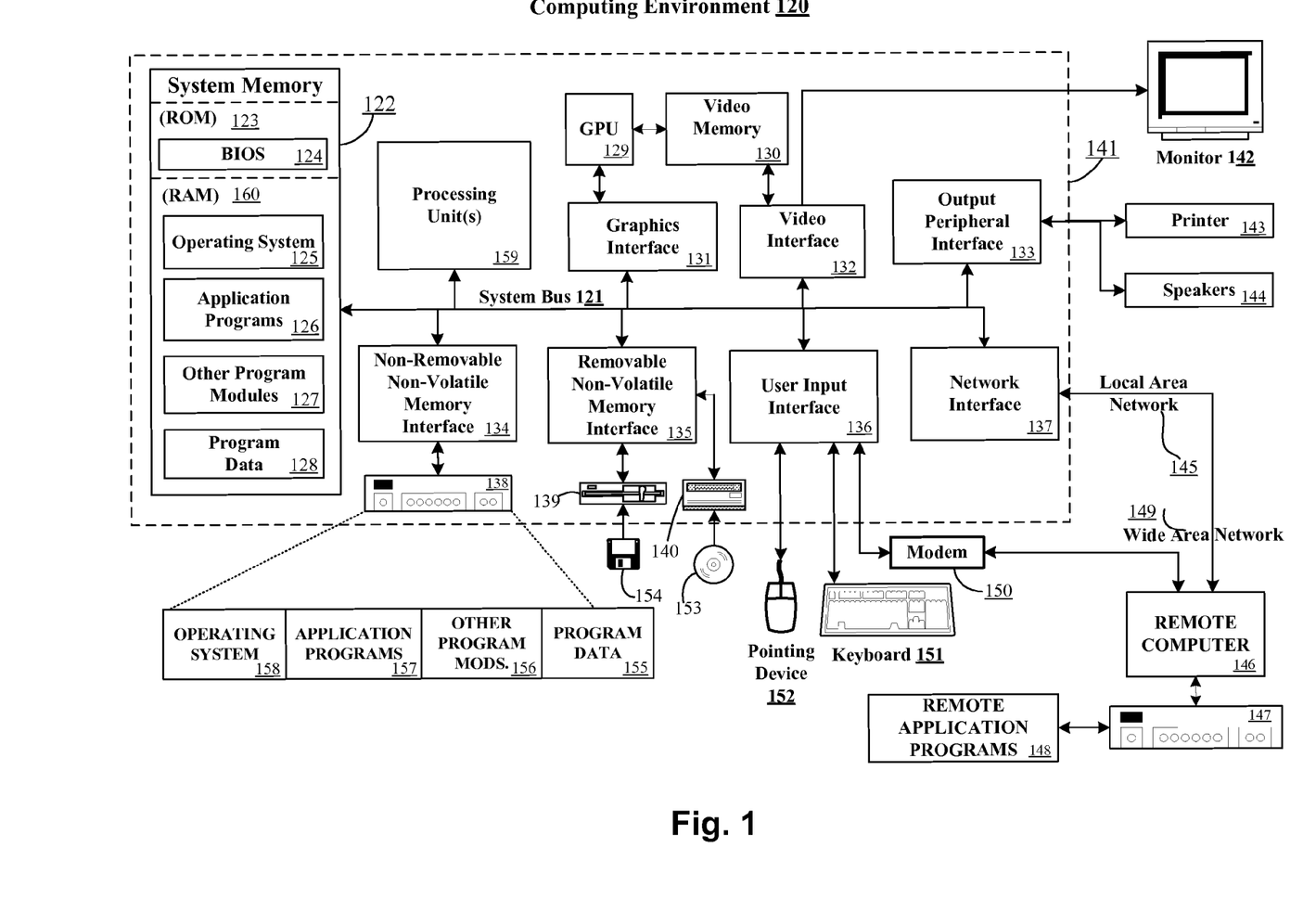
FIG. 1 illustrates an exemplary general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer readable media. Computer readable media can be any available media that can be accessed by computer 141 and includes both volatile and nonvolatile media, removable and non-removable media. The system memory 122 includes computer storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are exemplary and other means of establishing a communications link between the computers may be used.

Figure 2:
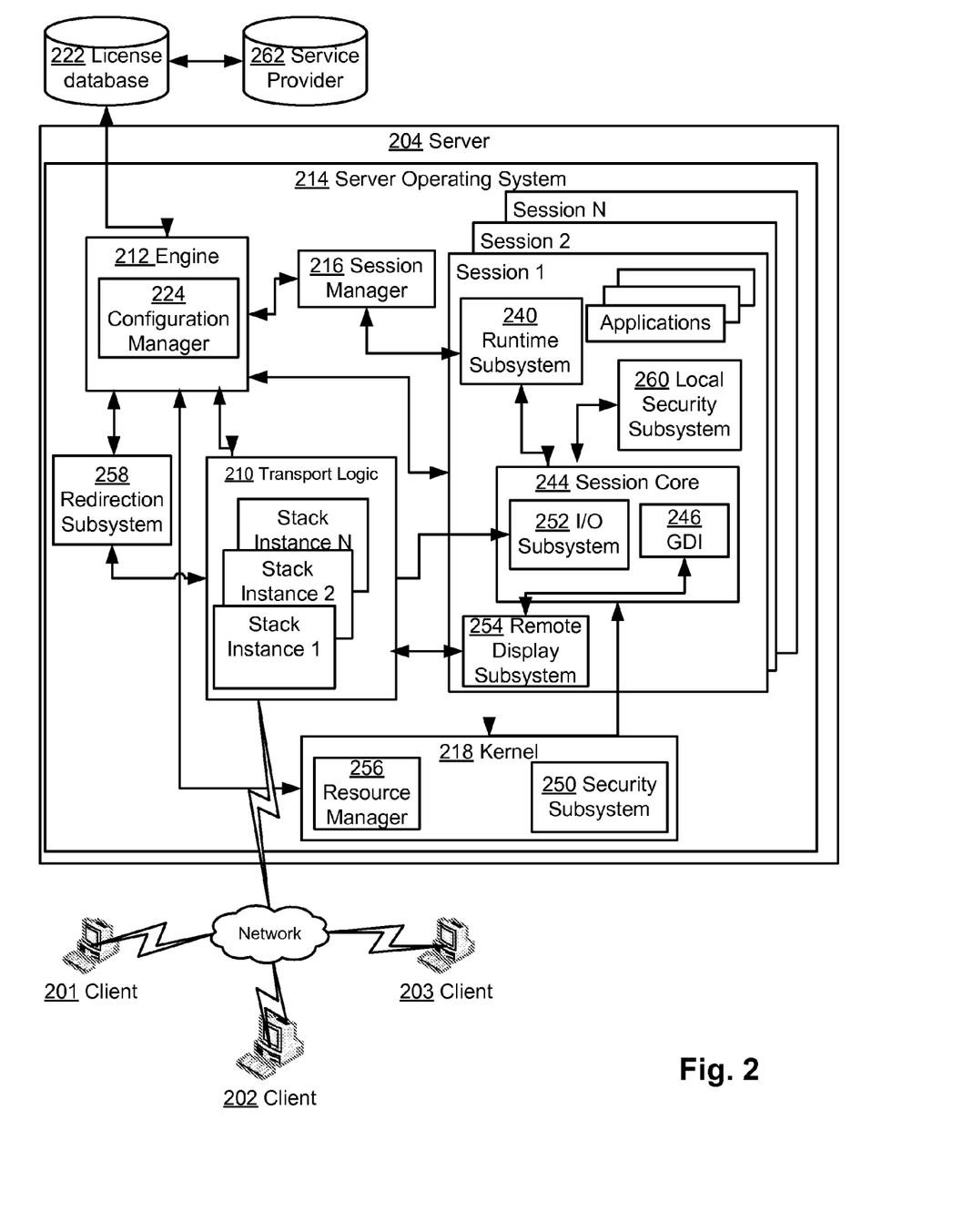
FIG. 2 depicts an operational environment for practicing aspects of the present disclosure.

Referring now to FIG. 2, it generally illustrates an example environment wherein aspects of the present disclosure can be implemented. One skilled in the art can appreciate that the example elements depicted by FIG. 2 provide an operational framework for describing the present disclosure. Accordingly, in some embodiments the physical layout of the environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures of FIG. 4.

Generally, FIG. 2 depicts a high level overview of a terminal server environment that can be configured to include aspects of the present disclosure. In reference to the figure, a server 204 is depicted that can include circuitry configured to effectuate a terminal server and for example, three example clients 201, 202, and 203 (while three clients are depicted the server 204 in embodiments can service more or less clients). The example clients 201-203 can include computer terminals effectuated by hardware configured to direct user input to the server 204 and display user interface information generated by the server 204. In other embodiments, clients 201-203 can be computers that include similar elements as those of computer 20 FIG. 1. In these example embodiments, clients 201-203 can include circuitry configured to effect operating systems and circuitry configured to emulate the functionality of terminals. In these examples one skilled in the art can appreciate that the circuitry configured to effectuate the operating systems can also include the circuitry configured to emulate terminals.

In the depicted example, the server 204 can be configured to generate one or more sessions for connecting clients 201, 202, and 203 such as sessions 1 through N (where N is an integer greater than 1). Briefly, a session in example embodiments of the present disclosure can generally include an operational environment that is effectuated by a plurality of subsystems, e.g., software code, that are configured to effectuate an execution environment and interact with a kernel 218 an operating system 214. For example, a session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. The session in this example can include similar subsystems as the session described above. Generally, a session can be generated by the server 204 on a user by user basis when, for example, the server 204 receives a connection request over a network connection from a client such as client 201. Generally, a connection request can first be handled by the transport logic 210 that can, for example, be effectuated by circuitry of the server 204. The transport logic 210 can in some embodiments include a network adaptor, firmware, and software that can be configured to listen for connection messages and forward them to the engine 212. As illustrated by FIG. 2, when sessions are generated the transport logic 210 can include protocol stack instances for each session. Generally, each protocol stack instance can be configured to route user interface output to an associated client and route user input received from the associated client to the appropriate session core 244.

As depicted by FIG. 2, during the session generation process the engine 212 can be configured to obtain a license for the session. For example, in one example embodiment the engine 212 can receive a license from the client 201 during the session generation process. In other example embodiments the engine 212 can receive a copy of a license from a license database 222. In some embodiments of the present disclosure the license database 222 can include a relational database management program that can be executed on an operating system of a computer such as computer 20 of FIG. 1. In an example embodiment that includes a license database 222, it can store one or more licenses that can be checked out when a client attempts to obtain a session from the server 204. In another embodiment each license can itself be associated with an account identifier, e.g., a username/password combination, a smartcard identifier, etc., and each license can only be checked out if the correct account identifier is presented. Generally, the number of connections that a server 204 can generate can be dependent upon the number of licensees the entity that controls the server 204 has purchased from a service provider. If for example, the entity has purchased one license, then the server 204 can be configured to only allow one session. In this example if the license is associated with an account identifier, then only a user that presents the correct account identifier can obtain a session.

In example embodiments of the present disclosure each license can be validated by a service provider 262 before they can be used. For example, the service provider 262 can in example embodiments act as a certificate authority that aphorizes and activates licenses and servers. In these embodiments the service provider 262 can ensure that licenses are not stolen, copied, or pirated. The service provider 262 can also ensure that the license are only used by the server 204 they are purchased for by storing a copy of the licenses in a database and associating the licenses with server 204.

As illustrated by FIG. 2, a configuration manager 224 in an example embodiment of the present disclosure can include computer readable instructions that when executed instantiate a process that can receive a license during the session creation process and determine a service level for a newly spawned session by interfacing with various subsystems such as session manager 216. The session manager 216 in an embodiment can be configured to initialize and manage each session by for example, generating a session identifier for a session space; adding the session identifier to a table; assigning memory to the session space; and generating system environment variables and instances of subsystem processes in memory assigned to the session space. As illustrated by FIG. 2, in an embodiment the session manager 216 can instantiate environment subsystems such as a runtime subsystem 240 that can include a kernel mode part such as the session core 244. For example, the environment subsystems in an embodiment can be configured to expose a subset of services to application programs and provide an access point to the kernel 218 of the operating system 214. As illustrated by FIG. 2, in some embodiments the kernel 218 can include a security subsystem 250 and a resource manager 256. In an example embodiment the security subsystem 250 can enforce security policies of the server 204 by, for example, performing runtime object protection. In these embodiments the resource manager 256 in an embodiment can create and terminate processes and threads in response to requests from the runtime subsystem 240. More specifically, in an embodiment the runtime subsystem 240 can request the execution of threads and the session core 244 can send requests to the executive of the kernel 218 to allocate memory for the threads and schedule time for them to be executed.

Continuing with the description of FIG. 2, in an embodiment the session core 244 can include a graphics display interface 246 (GDI) and an input subsystem 252. The input subsystem 252 in an example embodiment can be configured to receive user input from a client 201 via the protocol stack instance associated with the session and transmit the input to the session core 244. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and processed by the GDI 246. The GDI 246 in general can include a process that can generate graphical object draw commands. The GDI 246 in this example embodiment can be configured to pass the commands to the remote display subsystem 254 that can instantiate a display driver for the session. In an example embodiment the remote display subsystem 254 can be configured to include virtual display driver(s) that may not be associated with displays physically attacked to the server 204, e.g., the server 204 could be running headless. The virtual display driver in this embodiment can be configured to receive the draw commands and transmit them to the client 201 via a stack instance associated with the session.

Figure 3:
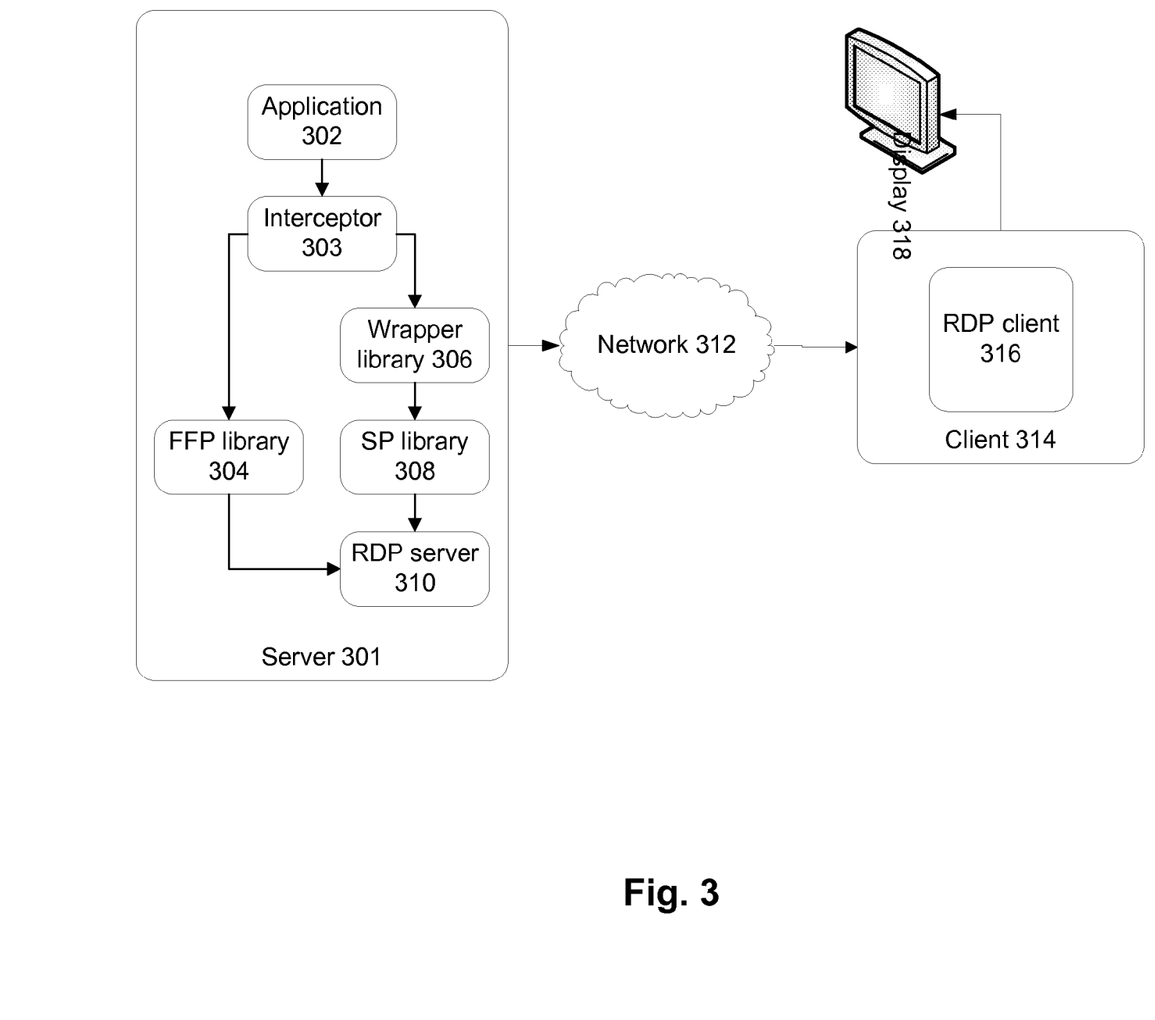
FIG. 3 illustrates a server sending a client graphics data across a remote session for an application, where the application makes fixed function pipeline API calls and the client and server support shader pipeline API calls for the remote session.

FIG. 3 illustrates a server sending a client 314 graphics data across a remote session for an application 302 on a server 301, where the application 302 makes fixed function pipeline API calls (such as those in DIRECT3D 9™) and the client 314 and server 301 support shader pipeline API calls (such as those in DIRECT3D 10™) for the remote session. Both DIRECT3D 9 and DIRECT3D 10 are versions of a graphics API that may be used to render two-and/or three-dimensional graphics Application 302 makes fixed function pipeline API calls to create graphics output to be displayed on a display device. Those calls are intended for a fixed function pipeline API library 304, but are intercepted by a library of the server's remote session application 303. This remote session library 303 may be loaded, for instance, when the application 302 first loads or when the application 302 first loads the fixed function pipeline API library 304. All fixed function pipeline API calls of the application 302 are intercepted by the remote session library 303, which then determines whether to direct the call to the originally intended fixed function pipeline API library 304 (such as where the graphics call is not intended to be sent over the remote session) or whether to transform the fixed function pipeline call into a shader pipeline call (such as where the graphics call is intended to be sent over the remote session).

A wrapper library 306 receives this intercepted fixed function pipeline call and wraps the result of the fixed function pipeline call, such that if the fixed function pipeline call causes the creation of a sub-object, then a wrapped version of that sub-object is generated.

The wrapped sub-object is then converted into a shader pipeline API call by the shader pipeline library 308. Where the fixed function pipeline comprises DIRECT3D 9, the DIRECT3D fixed-function-to-shader-pipeline converter may be used to convert the calls in the DIRECT3D 9 API that relate to the fixed function pipeline into DIRECT3D 9 compatible shaders. Then the DIRECT3D shader converter may be used to convert at runtime the DIRECT3D 9 shaders into DIRECT3D 10 compatible shaders.

The fixed function pipeline call may be mapped to a shader pipeline call in other ways. Some fixed function pipeline calls are identical to available shader pipeline calls. In that instance, the call may be used in its original state, without modification. Some fixed function pipeline calls are nearly identical to available shader pipeline calls. For instance, they may differ only in name, but have the same arguments and the same return value. Or, they may accept a subset of the arguments that the nearly identical shader pipeline call accepts, and any additional arguments may be provided as default values that cause the shader pipeline call to behave as the fixed function pipeline call does. In DIRECT3D 9, calls nearly identical to DIRECT3D 10 calls include SetTexture, SetVertexBuffer, SetRenderTarget, and SetStreamSource.

Some fixed function pipeline calls may be considered to influence the equivalent shader pipeline calls. For instance, these fixed function pipeline calls may be made to build up a chunk of state. In this case, an equivalent shader program that achieves the same result is identified and used. fixed function pipeline calls like this, in DIRECT3D 9, include SetTextureStageState, SetRenderState and other calls that affect state.

These shader pipeline calls are then sent to the remote session server 310, which transmits them to a remote session client 316 of a client 312 across a communications network 312. The client 314 generates an image corresponding to the primitive shader pipeline calls received and displays the image on display device 318.

Figure 3B:
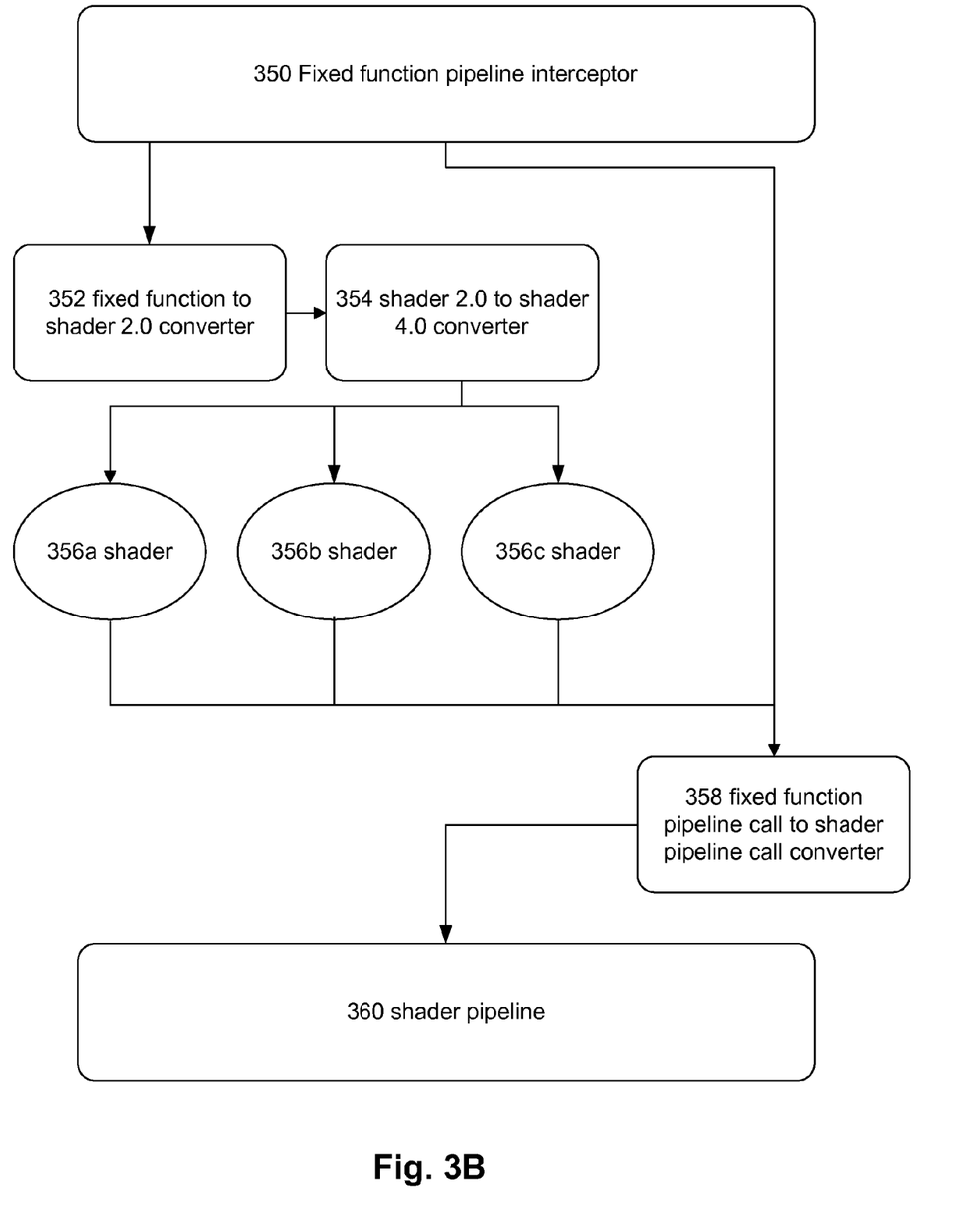
FIG. 3B illustrates an exemplary embodiment of the fixed-function-pipeline-to shader-pipeline converter of FIG. 3.

FIG. 3B illustrates an exemplary embodiment of the fixed-function-pipeline-to-shader-pipeline converter 306 of FIG. 3.

A fixed function pipeline interceptor 350 intercepts all fixed function calls made by an application. Those calls that may be directly converted into their shader pipeline counterpart, such as where the calls are identical between the fixed function pipeline and the shader pipeline, or where the call maps to a similar call, may be sent directly to the fixed-function-pipeline-to-shader-pipeline-call converter 358. Otherwise, the call is sent to the fixed-function-to-shader-2.0 converter 352.

The fixed-function-to-shader-2.0 converter 352 converts calls in the fixed function pipeline API that relate to the fixed function pipeline into fixed function pipeline compatible shaders. In an embodiment, this converter maps DIRECT3D legacy fixed function rendering settings to the more modern programmable shader technology, such as version 2.0 of the programmable shader language. In an embodiment, this comprises the DIRECT3D 9 fixed-function-pipeline-to-shader converter. These fixed function pipeline compatible shaders output are then converted into shader pipeline-compatible shaders at 354. Shader-to-shader converter 354 maps an older version of a programmable shader language to a more recent version of the programmable shader language. In an embodiment, it maps from DIRECT3D programmable shader language version 2.0 to DIRECT3D programmable shader language 4.0. The shader pipeline-compatible shader 356 is then provided to the fixed-function-pipeline-call-to-shader-pipeline-call converter 358, and from there the received call, whether received directly from the fixed function pipeline interceptor 350 or the shader-2.0-to-shader-4.0 converter 354, is sent to the shader pipeline 360, where a remote session obtains it and transmits it across the communications network 312 to the client 314.

In an embodiment, fixed-function-to-shader-2.0 converter 352 and shader-to-shader converter 354 are combined and perform a single-step conversion from fixed function rendering to shader 4.0 rendering, or an even more recent version of the shader language in question. An embodiment may have several converters that do single-step translation from a source rendering language to a common target language. For example, it would be possible to use a fixed function to 4.0 mapping, a 2.0 to 4.0 mapping, and other intermediates as necessary (e.g. 1.0 to 4.0, 3.0 to 4.0, etc.).

Figure 4:
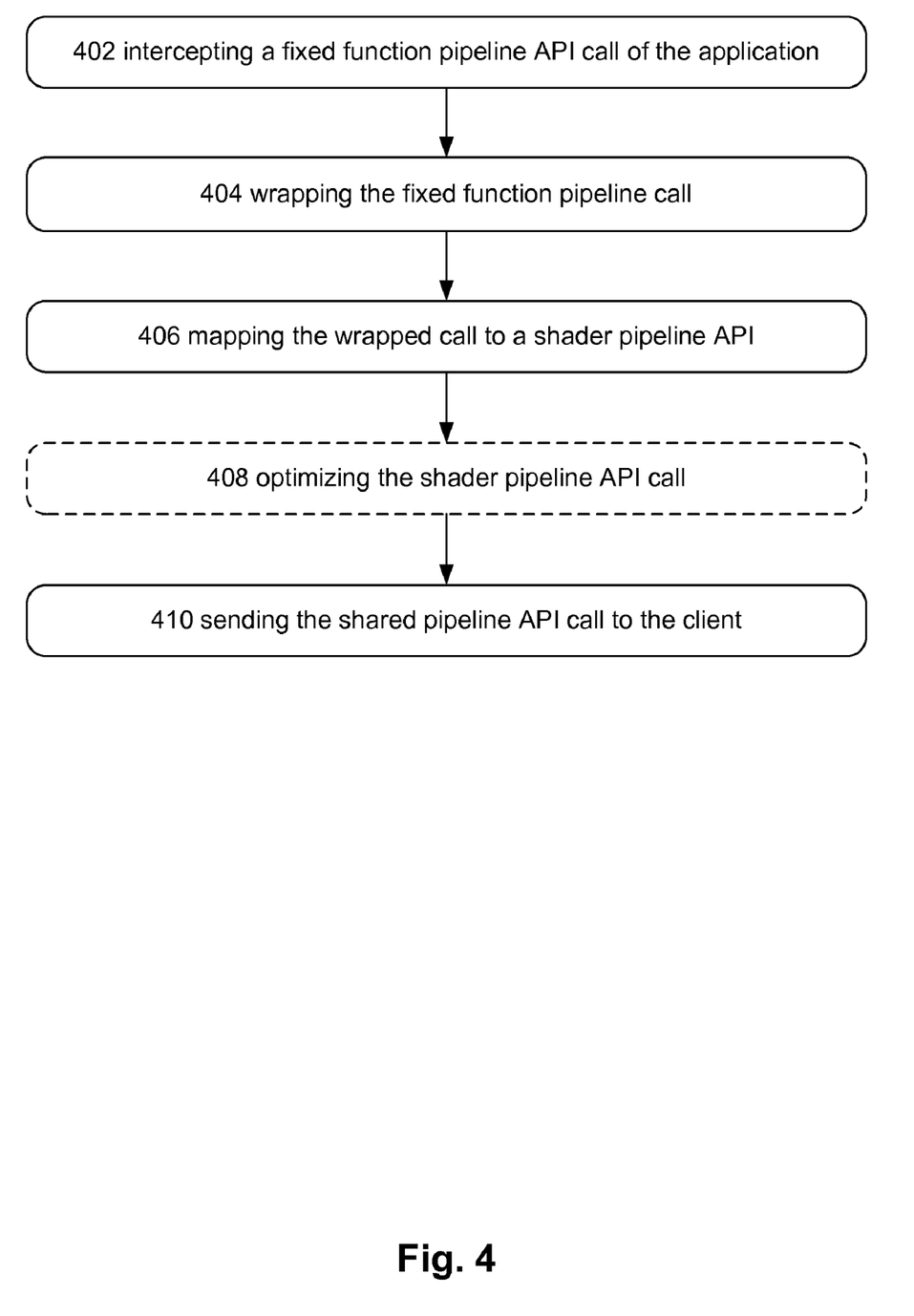
FIG. 4 illustrates exemplary operational procedures for converting fixed function pipeline API calls to shader pipeline API calls for transmission in a remote session that supports shader pipeline API calls.

FIG. 4 illustrates exemplary operational procedures for converting fixed function pipeline API calls from an application to shader pipeline API calls for transmission in a remote session that supports shader pipeline API calls. In an embodiment, the application comprises a WINDOWS PRESENTATION FOUNDATION™ application.

Operation 402 depicts intercepting a fixed function pipeline API call of the application.

In an embodiment, this comprises when the application attempts to load a fixed function pipeline API library corresponding to the fixed function pipeline API call, loading an interceptor library. In an embodiment this is accomplished via MICROSOFT DETOURS™, which intercepts Windows 32 functions by rewriting the in-memory code for target functions. It also provides utilities to attach arbitrary dynamic-link libraries (DLLs) and data segments to any Windows 32 binary.

Operation 404 depicts wrapping the fixed function pipeline call. In an embodiment, this wrapping may be accomplished with Detours with the following code that wraps the fixed function pipeline entry points:

```
HRESULT        (* fnTrue__Direct3DCreate9Ex)(UINT
    SDKVersion, IDirect3D9Ex **ppD3D) = Direct3DCreate9Ex;
```

```
DetourTransactionBegin( );
DetourUpdateThread(GetCurrentThread( ));
DetourAttach(&(PVOID&)fnTrue Direct3DCreate9Ex,
    WrapperDirect3DCreate9Ex); DetourTransactionCommit( )
```

The above exemplary machine-readable instructions may be used to remap the entry point to the fixed function pipeline API set (i.e. the object that creates all other child objects) with a wrapper. So, if a call to the fixed function pipeline API creates a sub-object, such as an IVertexBuffer, then a wrapped version of that object is returned.

Operation 406 depicts mapping the wrapped call to a shader pipeline API call.

In an embodiment, this comprises using a DIRECT3D fixed-funtion-to-shader-pipeline converter to convert the calls in the DIRECT3D 9 API that relate to the fixed function pipeline into DIRECT3D 9-compatible shaders. In an embodiment, this comprises using the DIRECT3D fixed-funtion-to-shader-pipeline converter to runtime convert the DIRECT3D 9 shaders to DIRECT3D 10-compatible shaders.

In an embodiment, mapping the wrapped call to the shader pipeline API call comprises determining that the fixed function pipeline call has a name, at least one argument and a return value that equals a name, at least one argument and a return value of a shader pipeline call, and sending the shader pipeline API call to the client comprises: sending the wrapped call to the client.

In an embodiment, mapping the wrapped call to the shader pipeline API call comprises determining that the wrapped call has an equivalent shader pipeline call. In an embodiment, a wrapped call has an equivalent shader pipeline call when the two calls have the same return value and arguments, or the same return value and the wrapped call's arguments comprise a subset of equivalent shader pipeline call's arguments.

In an embodiment, mapping the wrapped call to the shader pipeline API call comprises determining a shader pipeline API call that is influenced by the wrapped call. In an embodiment, a shader pipeline API call is influenced by the wrapped call when the shader pipeline call corresponds to a shader program that produces the same graphical output as the wrapped call.

Optional operation 408 depicts intercepting a plurality of fixed function pipeline API calls; wrapping each of the plurality of fixed function pipeline API calls; mapping each wrapped call to a shader pipeline API call; optimizing the shader pipeline API calls; and sending the optimized shader pipeline API calls to the client.

In an embodiment, optimizing the shader pipeline calls comprises batching a plurality of state set calls. In an embodiment, optimizing the shader pipeline calls comprises using small vertex formats—like using a 32-bit floating point number instead of a 64-bit double floating point number. In an embodiment, optimizing the shader pipeline calls comprises sending a mesh to the client after the mesh has changed, or sending a vertex buffer to the client after the vertex buffer has changed. In an embodiment, optimizing the shader pipeline calls comprises determining at least one second shader pipeline call that results in the same output as the shader pipeline calls; and substituting every second shader pipeline call for the shader pipeline calls. In an embodiment, optimizing comprises reducing extraneous information from the calls. For instance, where a call is made to determine the X, Y, and Z coordinates of a vertex, but only the X and Y coordinates are given values, and there is a similar call that takes only the X and Y values that requires fewer bits to transmit, that smaller call may be substituted for the larger call.

In an embodiment, optimizing comprises optimizing the fixed function pipeline to shader pipeline translation to focus on a current scenario. For instance, where a WINDOWS PRESENTATION FOUNDATION™ application is the application, only those DIRECT3D 9 calls that that application makes need to have wrappers implemented.

Operation 410 depicts sending the shared pipeline API call to the client. In an embodiment, this is performed according to a remote desktop protocol (RDP).

Conclusion

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for sending graphics calls for an application that uses a fixed function pipeline application programming interface (API) to a client via a remote session that supports sending shader pipeline API calls, comprising:
   intercepting a fixed function pipeline API call of the application;
   wrapping the fixed function pipeline call;
   mapping the wrapped call to a shader pipeline API call;
   sending the shader pipeline API call to the client;
   intercepting a second fixed function pipeline API call of the application;
   wrapping the second fixed function pipeline API call; and
   in response to determining that a name, argument, and return value of the second fixed function pipeline call is the same as a name, argument, and return value of a second shader pipeline API call, sending the wrapped fixed function pipeline API call to the client the client processing the second fixed function pipeline API call as the second shader pipeline API call.

2. The method of claim 1, wherein mapping the wrapped call to a shader pipeline API call comprises:
   determining that the wrapped call has an equivalent shader pipeline call; and
   mapping the wrapped call to the equivalent shader pipeline call.

3. The method of claim 2, wherein the wrapped call has the equivalent shader pipeline call because the two calls have the same return value and the wrapped call's arguments comprise a subset of equivalent shader pipeline call's arguments; and wherein mapping the wrapped call to the equivalent shader pipeline call comprises:
  identifying the shader pipeline call with the wrapped call's arguments, and a default value for an argument of the shader pipeline call that does not have a corresponding argument in the fixed function pipeline call.

4. The method of claim 1, wherein mapping the wrapped call to the shader pipeline API call comprises:
  determining a shader pipeline API call that is influenced by the wrapped call.

5. The method of claim 4, wherein an API call is influenced by a wrapped call when the shader pipeline call corresponds to a shader program that produces the same graphical output as the wrapped call.

6. The method of claim 1, further comprising:
  intercepting a plurality of fixed function pipeline API calls;
  wrapping each of the plurality of fixed function pipeline API calls;
  mapping each wrapped call to a shader pipeline API call;
  optimizing the shader pipeline API calls; and
  sending the optimized shader pipeline API calls to the client.

7. The method of claim 6, wherein optimizing the shader pipeline calls comprises:
  converting at least one of the wrapped calls from a 64-bit format to a corresponding 32-bit format.

8. The method of claim 6, wherein optimizing the shader pipeline calls comprises:
  in response to determining that a mesh corresponding to the shader pipeline calls has changed, but a vertex buffer corresponding to the mesh has not changed, sending the mesh to the client without sending the vertex buffer to the client.

9. The method of claim 6, wherein optimizing the shader pipeline calls comprises:
  determining at least one second shader pipeline call that results in the same output as the shader pipeline calls; and
  substituting every second shader pipeline call for the shader pipeline calls.

10. The method of claim 6, wherein optimizing the shader pipeline calls comprises:
  in response to determining that a vertex buffer corresponding to the shader pipeline calls has changed, but a mesh corresponding to the vertex buffer has not changed, sending the vertex buffer to the client without sending the mesh to the client.

11. The method of claim 1, wherein intercepting a fixed function pipeline API call of the application comprises:
  when the application attempts to load a fixed function pipeline API library corresponding to the fixed function pipeline API call, loading an interceptor library.

12. A system for sending graphics calls for an application that uses a fixed function pipeline application programming interface (API) to a client via a remote session that supports sending shader pipeline API calls, comprising:
  a processor; and
  a memory communicatively coupled to the processor when the system is operational, the memory bearing processor-executable instructions that, when executed on the processor, cause the system to at least:
    intercept a fixed function pipeline API call of the application;
    wrap the fixed function pipeline call;
    map the wrapped call to a shader pipeline API call;
    send the shared pipeline API call to the client;
    intercept a second fixed function pipeline API call of the application;
    wrap the second fixed function pipeline API call; and
    in response to determining that a name, argument, and return value of the second fixed function pipeline call is the same as a name, argument, and return value of a second shader pipeline API call, send the wrapped fixed function pipeline API call to the client, the client processing the second fixed function pipeline API call as the second shader pipeline API call.

13. The system of claim 12, wherein processor-executable instructions that, when executed on the processor, cause the system to at least map the wrapped call to a shader pipeline API call further cause the system to at least:
  determine that the wrapped call has an equivalent shader pipeline call.

14. The system of claim 13, wherein the wrapped call has the equivalent shader pipeline call because the two calls have the same return value and the wrapped call's arguments comprise a subset of equivalent shader pipeline call's arguments; and
  wherein the instructions that, when executed on the processor, cause the system to at least map the wrapped call to the equivalent shader pipeline call further cause the system to at least:
    identify the shader pipeline call with the wrapped call's arguments, and a default value for an argument of the shader pipeline call that does not have a corresponding argument in the fixed function pipeline call.

15. The system of claim 12, wherein the processor-executable instructions that, when executed on the processor, cause the system to at least map the wrapped call to the shader pipeline API call further cause the system to at least:
  determine a shader pipeline API call that is influenced by the wrapped call.

16. The system of claim 15, wherein a shader pipeline call is influenced by a wrapped call when the shader pipeline call corresponds to a shader program that produces the same graphical output as the wrapped call.

17. The system of claim 12, wherein the memory further bears processor-executable instructions that, when executed on the processor, cause the system to at least:
  intercept a plurality of fixed function pipeline API calls;
  wrap each of the plurality of fixed function pipeline API calls;
  map each wrapped call to a shader pipeline API call;
  optimize the shader pipeline API calls; and
  send the optimized shader pipeline API calls to the client.

18. The system of claim 17, wherein the processor-executable instructions that, when executed on the processor, cause the system to at least optimize the shader pipeline calls comprises:
  convert at least one of the wrapped calls from a 64-bit format to a corresponding 32-bit format.

19. The system of claim 17, wherein the processor-executable instructions that, when executed on the processor, cause the system to at least optimize the shader pipeline calls further cause the system to at least:
  in response to determining that a vertex buffer corresponding to the shader pipeline calls has changed, but a mesh corresponding to the vertex buffer has not changed, send the vertex buffer to the client without sending the mesh to the client.

20. A computer-readable storage medium excluding signals comprising computer-readable instructions, that when executed on a computer, cause the computer to perform operations comprising:

intercepting a fixed function pipeline API call of the application;
wrapping the fixed function pipeline call;
mapping the wrapped call to a shader pipeline API call;
sending the shader pipeline API call to the client;
intercepting a second fixed function pipeline API call of the application;
wrapping the second fixed function pipeline API call; and
in response to determining that a name, argument, and return value of the second fixed function pipeline call is the same as a name, argument, and return value of a second shader pipeline API call, sending the wrapped fixed function pipeline API call to the client, the client processing the second fixed function pipeline API call as the second shader pipeline API call.

* * * * *

UNITED STATES PATENT AND TRADEMARK OFFICE
CERTIFICATE OF CORRECTION

PATENT NO. : 8,203,566 B2  
APPLICATION NO. : 12/475287  
DATED : June 19, 2012  
INVENTOR(S) : Abdo et al.

Page 1 of 1

It is certified that error appears in the above-identified patent and that said Letters Patent is hereby corrected as shown below:

In column 10, line 55, in Claim 1, after "client" insert -- , --.

Signed and Sealed this
Eighteenth Day of December, 2012

David J. Kappos
*Director of the United States Patent and Trademark Office*